INVENTORS.
GEORGE OLAH
HERBERT ARTHUR SMITH
BY Mock & Blum
ATTORNEYS

INVENTORS
GEORGE OLAH
HERBERT ARTHUR SMITH
BY Mock + Blum
ATTORNEYS

INVENTORS.
GEORGE OLAH
HERBERT ARTHUR SMITH
BY Mock & Blum
ATTORNEYS

INVENTORS
GEORGE OLAH
HERBERT ARTHUR SMITH
BY Mock & Blum
ATTORNEYS

Patented Jan. 12, 1954

2,665,964

UNITED STATES PATENT OFFICE 2,665,964

RECORDING INSTRUMENT

George Olah, London, and Herbert Arthur Smith, Charlton, London, England, assignors to Elliott Brothers (London) Limited, London, England, a British company Application May 22, 1951, Serial No. 227,581

Claims priority, application Great Britain May 25, 1950

6 Claims. (Cl. 346—32)

The present invention relates to recording apparatus for use in recording instruments of the type (hereinafter referred to as "of the type described") having a movable recording surface, a recording element supported adjacent the recording surface and means to move the recording element into and out of engagement with the recording surface at intervals.

The invention has for its object to enable records of instantaneous values of variable conditions from different sources to be made on the same recording surface and to distinguish clearly between the several records.

According to the invention, recording apparatus for a recording instrument of the type described comprises a carrier for a plurality of recording elements, means to move the carrier in relation to the recording surface in accordance with the value to be recorded, and means to move the carrier to bring a particular recording element required into operative position in proximity with the recording surface. Preferably, the recording elements are moved into operative position in succession and, in this case, the carrier may be rotatable and the means to move the carrier may comprise a ratchet and pawl, one of which is relatively fixed.

The carrier may be mounted on an arm pivotally supported from a member to which the pawl is secured.

The member pivotally supporting the arm may be secured to a member movable transversely of the recording surface in accordance with the value of the condition to be recorded.

Figure 1:
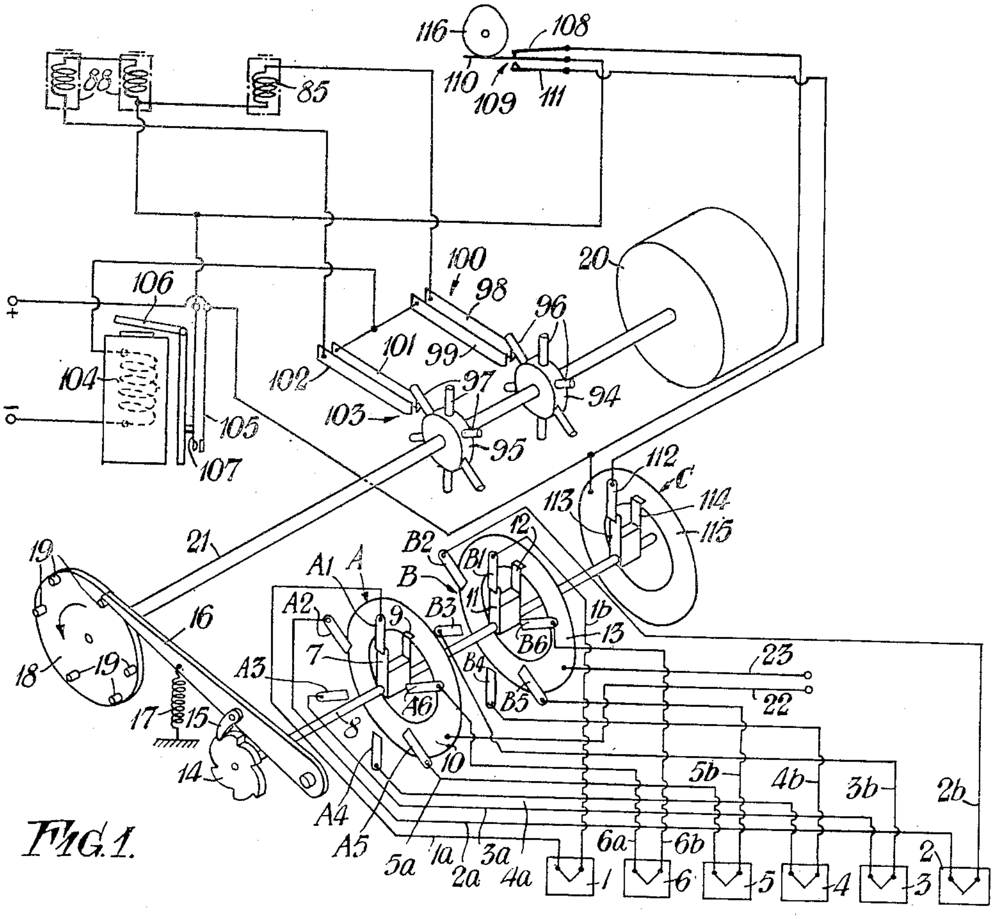
Figure 2:
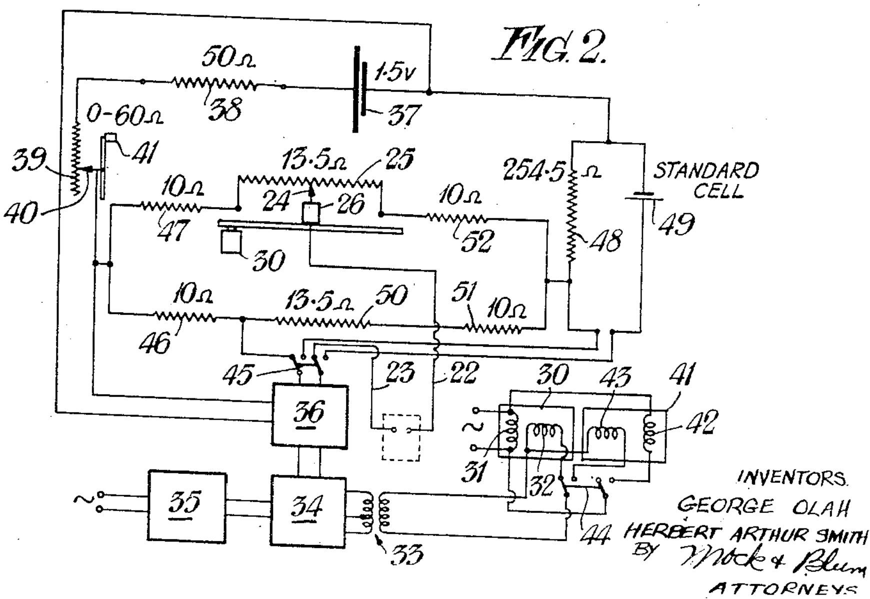
Figure 7:
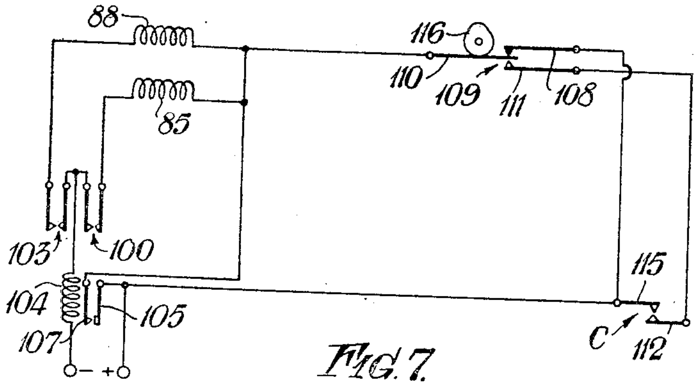
Figure 3:
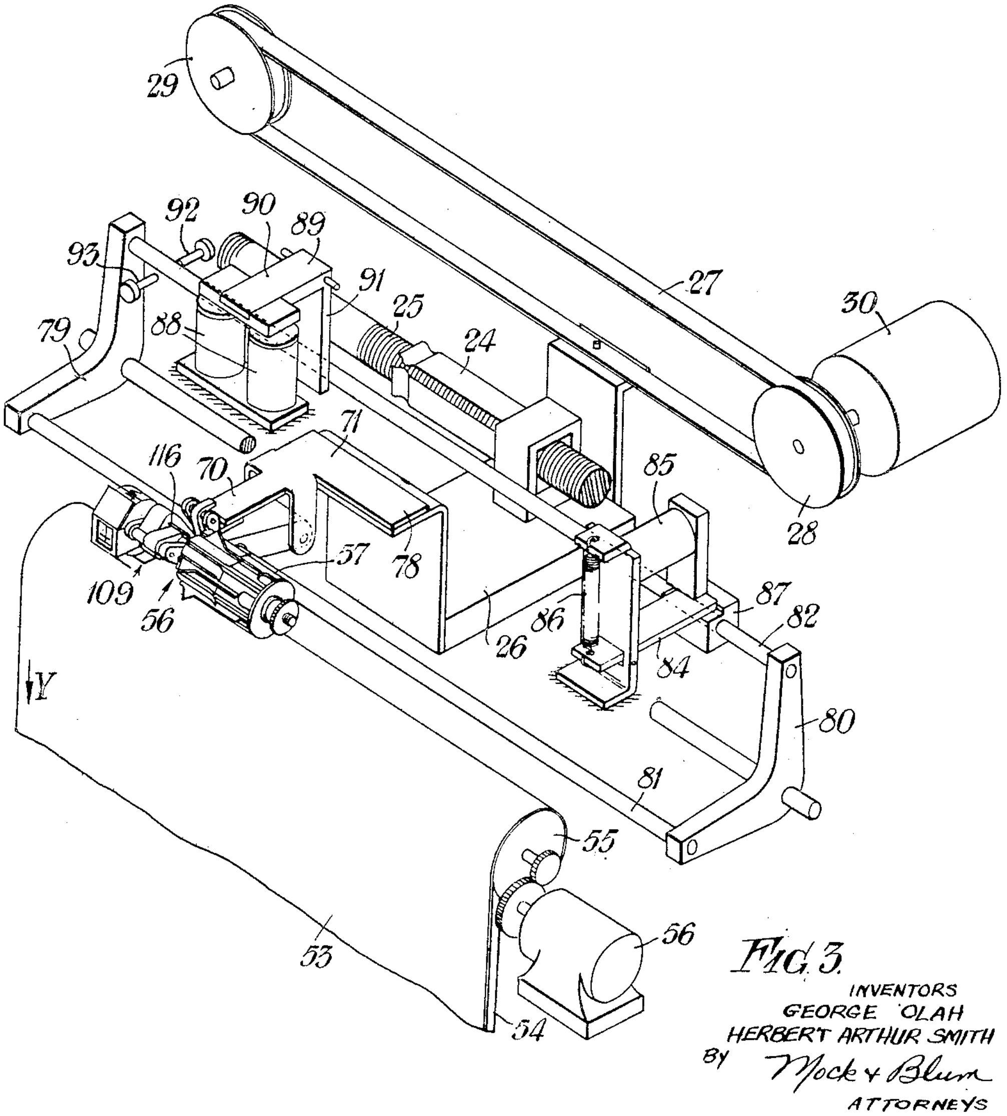
Figures 4, 5, 6:
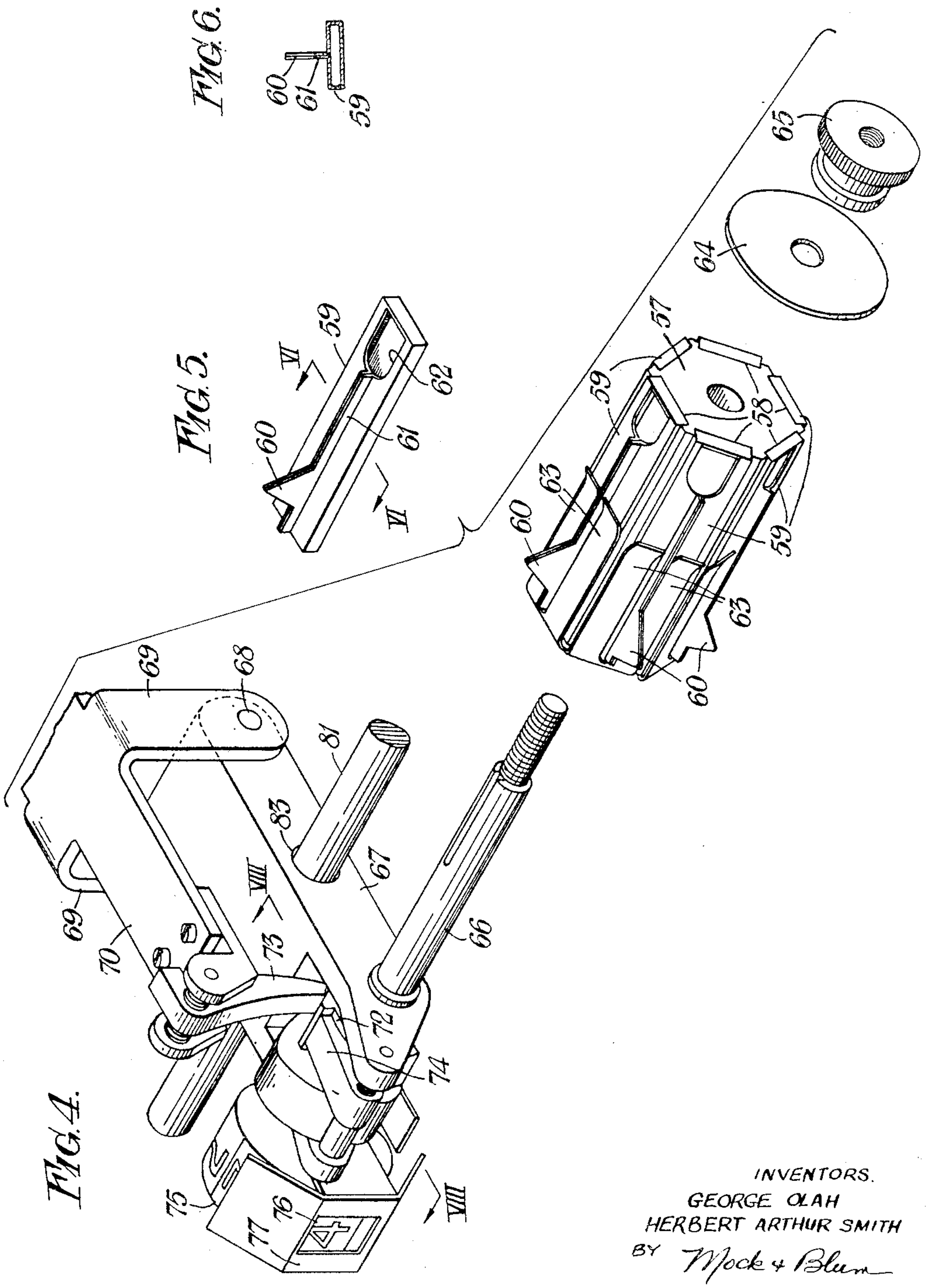
Figures 8, 9:
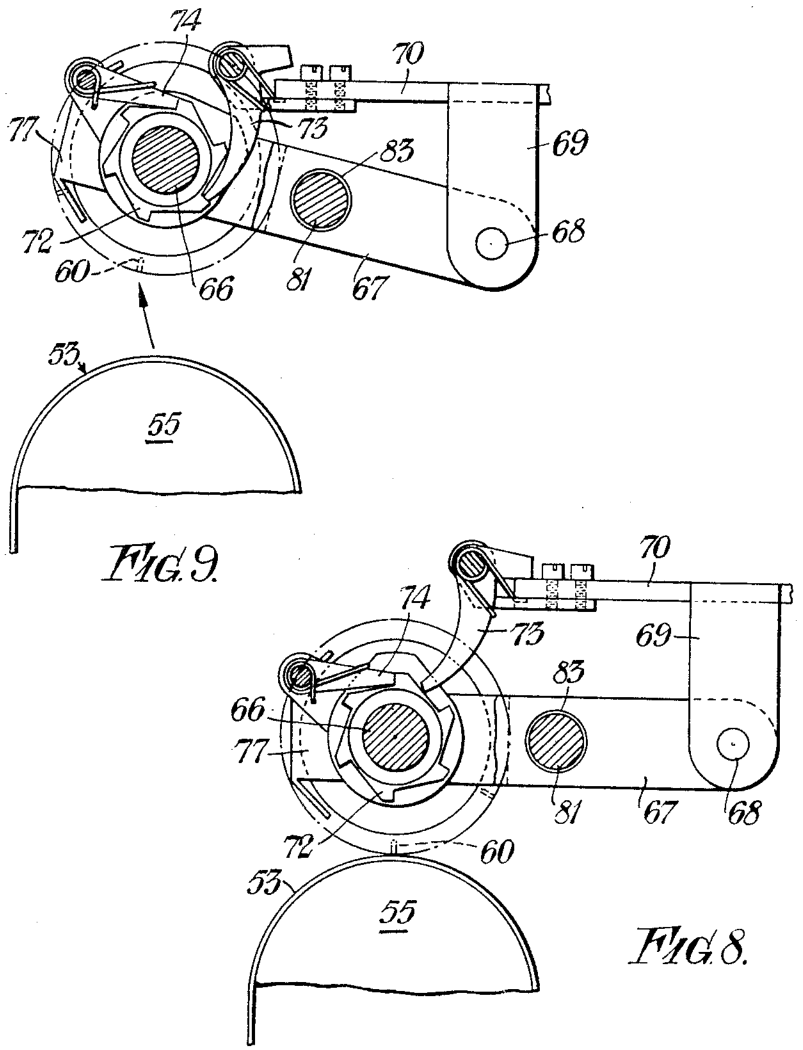

In order that the invention may readily be understood one form thereof will now be described, by way of example, as applied to an apparatus for automatically and successively recording the instantaneous temperatures of a bank of furnaces, with reference to the accompanying drawings, in which:

Figure 1 is a diagrammatic view, including the circuit connections, of the apparatus for connecting individually and successively the thermocouples to the recording instrument, Figure 2 is a circuit diagram of the means for automatically measuring and indicating the value of the condition to be recorded, Figure 3 is a perspective view of the means for recording the values measured and indicated, Figure 4 is an exploded view of the part of the recording apparatus which enables the records of values of conditions from different sources to be made on the same recording surface, Figure 5 is a perspective view of a recording pen forming part of the apparatus shown in Figure 4, Figure 6 is a cross section on the lines VI—VI of Figure 5, Figure 7 is a circuit diagram of the synchronising gear for the instrument, Figure 8 is a cross section on the lines VIII—VIII of Figure 4, showing a pen in contact with the recording surface, and Figure 9 is a view similar to Figure 8 with the pen lifted from contact with the recording surface.

The recording instrument is intended for use in recording individually and sequentially the instantaneous values of variable conditions from a plurality of different sources. In the example chosen the values are of the temperatures of a bank of six furnaces. A signal, corresponding to a value of temperature is obtained from a thermocouple 1 associated with a first furnace (not shown). The output from one side of the thermocouple 1 is taken by a lead 1*a* to a first stud $A_1$ on a first step-by-step selector switch A. The output from the other side of the thermocouple 1 is taken by a lead 1*b* to a first stud $B_1$ on a second step-by-step selector switch B. A similar thermocouple 2, 3, 4, 5, 6 is provided for each of the remaining furnaces (not shown) and the outputs from these thermocouples are connected on their one sides by leads 2*a*, 3*a*, 4*a*, 5*a*, 6*a* to studs $A_2$, $A_3$, $A_4$, $A_5$, $A_6$, of the first selector switch A and on their other sides by leads 2*b*, 3*b*, 4*b*, 5*b*, 6*b* to studs $B_2$, $B_3$, $B_4$, $B_5$, $B_6$ of the second selector switch B.

The selector switch A has a contact arm 7 which is mounted on a rotatable shaft 8, and which contacts the studs of the switch. A second arm 9 is also mounted on the shaft and is connected to the first arm 7 and contacts a stationary ring 10.

The selector switch B has a first contact arm 11, which is mounted on the shaft 8 and which contacts the studs of the switch, and a second arm 12, mounted on the shaft 8, and which contacts a stationary ring 13.

A six-toothed ratchet wheel 14 is mounted on the end of the shaft 8. A pawl 15, pivotally mounted on a pivoted lever 16, engages the teeth of the wheel 14, and is held in engagement by a tension spring 17 acting upon the lever 16. The end of the lever 16 lies adjacent the face of a flat rotatable plate 18 from the face of which six pins 19 project. The pins 19 are arranged on a circle about the centre of the plate 18 and the end of the lever 16 lies across their path during rotation of the plate 18. The plate 18 is driven at constant speed by a synchronous motor 20 through a shaft 21.

The rings 10 and 13 are connected across a part of a self-balancing potentiometer system (to be described hereinafter) by means of two leads 22 and 23.

In use, the motor 20 revolves, driving the plate 18 in the direction of the arrow Z. A pin 19 engages the end of the lever 16 to lift it against the action of the spring 17 until the pawl 15 engages a tooth of the ratchet wheel 14. The pin 19 then passes beyond the end of the lever 16, which slips off the pin on to the next succeeding pin 19. This action takes place quickly and causes the ratchet wheel to revolve one sixth of a revolution, thus moving the arms 7 and 11 to contact the next succeeding studs $A_2$ and $B_2$. The motor 20 continues to revolve and the action is repeated.

Thus the signals received from the thermocouples 1 to 6 are fed in turn to the leads 22 and 23.

The self-balancing potentiometer system above referred to (see Fig. 2) comprises a normally balanced bridge circuit in which a cell is connected in bucking relation to the output of whichever thermocouple is connected to the leads 22 and 23. The output of the bridge circuit is converted into an interrupted electric current, which is amplified and fed to a reversible rebalancing motor. A slide wire resistance is included in the bridge circuit and its slider is adjusted along the slide wire by the motor until the bridge is balanced, in which condition the two opposing currents are equal and opposite and the motor is de-energised.

The lead 22 is connected to a slider 24 for a helically wound slide wire resistance 25 (see Figs. 2 and 3). The slider 24 is mounted upon a carriage 26 (see Fig. 3) which is driven by means of an endless tape 27 running over two pulleys 28 and 29, one of which is driven by the rebalancing motor 30. One winding 31 of this motor 30 (see Fig. 2) is supplied with alternating current, whilst the other winding 32 is connected to the output transformer 33 of an amplifier 34.

The amplifier 34 is supplied with power from a power pack 35 which is connected to a supply of alternating current. The input to the amplifier is from a magnetic inverter 36. One input to the inverter 36 is from a cell 37 through a resistance 38 and a sliding wire resistance 39, the slider 40 of which can be moved along the wire by means of an endless tape by a reversible motor 41. One winding 42 of this motor 41 can be supplied with alternating current and the other winding 43 can be connected to the output transformer 33 by means of a double pole switch 44 which disconnects the winding 32 of the motor 30 from the said transformer. The other input to the magnetic inverter is through a second double pole switch 45 ganged to the switch 44, and is either through a resistance 46, a resistance 47, the sliding wire resistance 25, the slider 24, the lead 22, whichever thermocouple has been selected by the selector switches A and B, and the lead 23, or through a resistance 48 and a standard cell 49. The one end of the resistance 46 is connected to a resistance 50, a resistance 51 to the resistance 48. The other end of the resistance 46 is connected to the slider 40. The resistance 51 is also connected through a resistance 52 to the end of the slide wire resistance 25. The positive plates of the cells 37 and 49 are connected.

The recording instrument has a movable recording surface or chart 53 (see Fig. 3) of paper or other suitable material. This chart 53 is carried on a suitable platen 54 and is driven in the direction of the arrow Y by the roller 55, over which the chart passes, and which is in turn driven by a constant speed synchronous motor 56.

Closely spaced above the chart 53 on the roller 55 is a recording head 56 carrying a plurality of recording elements which are successively brought into contact with the chart 53, each element making a mark on the chart which is distinctive of one of the furnaces. The recording head 56 comprises a rotatably mounted carrier 57 (see Fig. 4) of substantially hexagonal cross-section having an axially extending recess 58 formed in each of its longitudinal faces to receive a recording element. The recording elements consist of reservoir pens 59 filled with different coloured inks or provided with nibs 60 having different characteristics. Each reservoir pen 59 comprises a shallow ink receptacle of substantially the same dimensions as the recess 58 in which it is fitted and having a nib 60 which projects therefrom at right angles to the face of its recess. Each pen 59 is constructed from a single strip of sheet metal (see Figs. 5 and 6) which is bent to form a closed tube of rectangular cross-section, the longitudinal edges of the material providing a perpendicular rib 61 of double thickness which is cut away to leave a triangular-shaped projection constituting the nib 60 adjacent to one end of the tube and the other end of the tube being formed with an aperture 62 for filling the tube with ink. The pens 59 are retained in their recesses 58 by spring means comprising six pairs of resilient fingers 63 projecting from a plate secured to one end of the rotatable carrier 57, each pair of fingers 63 bearing against the outer surface of a pen 59 on either side of the longitudinal rib 61 thereof. The pens may be removed longitudinally from their recesses and are prevented from accidental removal by a second end plate 64 at the other end of the carrier. This second end plate 64 is removably held against the carrier by a thumb screw 65.

In order that the pens may be brought successively into a position in which they may contact the recording chart, the carrier 57 for the pens is secured on a shaft 66 which is rotatably mounted in one end of an arm 67 which is pivotally mounted at 68 at its other end between a pair of downturned lugs 69 on one limb 70 of an L-shaped member 71 (see Fig. 3) the axes of the shaft 66 and pivot 68 being parallel. The end of the arm 67 carrying the shaft 66 is cut away to accommodate a ratchet wheel 72 mounted on the shaft 66 and adapted to be engaged by a spring urged pawl 73 pivotally mounted on the extremity of the one limb 70 of the L-shaped member 71 so that when the arm 67 is raised about its pivot 68 relatively to the L-shaped member 71, the ratchet wheel 72 is engaged by the pawl 73 and angularly displaced to rotate the shaft 66 through one sixth of a revolution and to bring the next pen 59 into operative position. Rotation of the shaft 66 in the reverse direction is prevented by means of a second pawl 74.

The end of the shaft 66 remote from the carrier 57 for the pens has a drum 75 fixed thereon which may have the numerals 1 to 6 angularly spaced around its periphery on backgrounds of the same colours as the inks used in the pens 59, each numeral and its associated colour being visible through an opening 76 in a frame 77 carried on the arm 67 as the corresponding pen 59 is brought into an operative position.

The other limb 78 of the L-shaped arm 71 (see Fig. 3) is secured to the carriage 26 which is adjustable along a path extending parallel to the axis of the rotatable shaft 66 carrying the recording elements to a position corresponding to the value of the condition being measured, i. e., in this case, the temperature of a furnace, so that the recording head is caused to move transversely of the recording surface, which bears a temperature scale, and to take up a position in which the operative pen may be lowered into contact with the recording chart to indicate the temperature of that furnace. Upon raising the pen out of contact with the recording chart, the carrier 57 for the pens is rotated by means of the pawl 73 and ratchet 72 hereinbefore described to bring the next pen 59 into operative position relatively to the recording chart.

This raising and lowering of the arm 67 carrying the rotatable shaft 66 is effected automatically by electromagnetically operated means in the manner now to be described. A pair of L-shaped arms 79, 80 (see Fig. 3) is pivotally secured to the instrument at the junction of their limbs and they are interconnected by means of a pair of transverse rods 81, 82 passing through the extremities of their arms. One transverse rod 81 (see Fig. 4) passes freely through a bore 83 in the arm 67 supporting the pen carrier 57 so that the latter is raised or lowered by rotation of the pair of L-shaped arms 79, 80 in the appropriate direction. The weight of the arm 67 and pen carrier 57 tends to rotate the L-shaped arms 81, 82 in a direction to lower the pen carrier 57. This rotation is prevented by the armature 84 (see Fig. 3) of an electro-magnet 85, which is urged by a spring 86 into contact with a stop 87 on the other transverse rod 82. Energisation of the electro-magnet 85 (hereinafter termed the trip magnet) lifts the armature 84 to release the transverse rod 82, so that the L-shaped arms 81, 82 rotate in a direction to lower the pen carrier 57. Rotation of the pair of L-shaped arms 81, 82 in a direction to raise the pen carrier 57 is effected by energisation of a pair of electro-magnets 88 (hereinafter termed the colour change magnets). The armature 89 of the colour change magnets is L-shaped and is pivoted at the junction of its limbs 90 and 91. Energisation of the magnets 88 causes the one limb 90 of the armature 89 to drop and the other limb 91 to engage the rod 82 to rotate the L-shaped arms 81, 82 in a direction to raise the pen carrier 57. Resilient stops 92, 93 limit the movement of the rod 82 in each direction.

The energisation of the magnets 85 and 88 is effected by means of the synchronous motor 20 (see Fig. 1). On the shaft 21 of the motor 20 are fixed two insulated wheels 94, 95 each of which has six contact pins 96, 97 projecting radially therefrom. Each pin 96 passes between leaves 98, 99 of a switch 100 in wiping contact therewith, and each pin 97 passes between leaves 101, 102, of a second switch 103 in wiping contact therewith. The pins on each insulated wheel are arranged symmetrically around the wheel, and the pins 96 are arranged slightly in advance of the pins 97 so that leaves 98 and 99 are connected before the leaves 101 and 102 and are in turn disconnected before these leaves.

The leaves 99 and 101 are interconnected and connected to one side of a hold-on electro-magnet 104, the other side of which is connected to one side of a direct current electric supply. The other side of the direct current supply is connected to one contact 105 of a switch controlled by the armature 106 of the magnet 104, which armature engages the other contact 107 and connects the contacts 105 and 107 when the magnet 104 is energised.

The other side of the direct current supply is also connected to a fixed contact 108 of a single pole double throw switch 109, mounted on the carrier arm 57 (see Fig. 3). The movable contact 110 of the switch 109 is connected to the one side of the electro-magnets 85 and 88. The other side of the electro-magnet 85 is connected to the leaf 98 of the switch 100. The other side of the electromagnets 88 is connected to the leaf 102 of the switch 103.

When a pin 96 connects the leaves 98 and 99, current will flow through the trip magnet 85 and hold-on magnet 104 and the L-shaped arms 79 and 80 are allowed to rotate in a direction to lower the pen carrier 57 to cause a record to be made on the chart. Immediately afterwards, a pin 97 connects the leaves 101 and 102, and current flows through the colour change magnets 88. The L-shaped arms 79 and 80 are rotated in a direction to raise the pen carrier 57 so that the pen is clear of the chart and so that the pawl 73 causes the ratchet wheel 72 to rotate through one sixth of a revolution to bring the next pen into the operative position. The L-shaped arms are held in the raised position until the pin 96 has passed from contact between the leaves 98 and 99, so that the trip magnet is de-energised and the spring 86 urges the armature 84 into contact with the stop 87.

Subsequently the pin 97 passes from contact between the leaves 101 and 102 thus de-energising the colour change and hold-on magnets.

Shortly afterwards the end of the lever 16 slips off a pin 19 and turns the ratchet wheel 14 and shaft 8 to select a thermocouple associated with the next furnace. Thus the trip magnet 85 is not energised to bring the operative pen into contact with the chart until sufficient time has elapsed for the carriage 26 to complete its traversing movement and rebalance the bridge circuit of the potentiometer system.

The adjustment of the carriage 26 in accordance with the value of the temperature to be recorded is effected by means of the endless tape 27 connected to the carriage 26 and driven by means of the rebalancing motor 30, the tape being guided by means of an idler pulley 29. This motor is rotated in the appropriate direction to adjust the carriage 26 by means of a voltage derived from a bridge circuit in which a cell is connected in bucking relation to the output on a thermo-couple associated with the furnace which is to have its temperature recorded. The output of the bridge circuit is converted into an interrupted electric current, by means of the magnetic inverter 36, which is amplified before being fed to the motor 30. A slide wire resistance 25 is included in the bridge circuit and its slider 24 is adjusted along the slide wire until the bridge is balanced, in which condition the two opposing currents are equal and opposite and the motor 30 is de-energised. Obviously, the adjustment of the slider 24 along the slide wire to obtain a condition of balance must be effected automatically and, for this purpose, as explained above it is connected to the endless tape 27 driven by the motor 30.

In order that the voltage of the cell 37 may be readily checked from time to time to ensure that the signal received from a thermo-couple is checked against an accurate standard, the double pole switches 44 and 45 (see Fig. 2) are moved to their right hand position. In this position the magnetic inverter 36 compares the signal received from the standard cell 49 with the signal received from the cell 37. Should this latter signal differ from its correct value, a signal will be passed to the amplifier 34 for amplification and transmission through the output transformer 33 and switch 44 to the second winding 43 of the reversible motor 41. This motor will continue to rotate and move the slider 40 over the slider wire 39 until the signal received from the cell 37 is again at its correct value.

A difficulty arises if the pen in the operative position does not correspond to the furnace which is having its temperature ascertained, since the points plotted on the recording surface will not have the correct colours or characteristics, for example, No. 1 pen may be recording the temperature of No. 3 furnace, No. 2 pen the temperature of No. 4 furnace, No. 3 pen the temperature of No. 5 furnace and so on. It is, of course possible to bring the pens and furnaces into step by manually rotating the carrier for the pens until the correct pen is in the operative position, but it is preferred to provide automatic synchronisation.

In the apparatus described above (see Figs. 1 and 7) this synchronisation may be effected in the following manner. The second contact 111 of the switch 109 is connected to one contact stud 112 of a single pole rotary switch C. The movable contact arm 113 of this switch C is mounted on the shaft 8 and is connected to a second arm 114 engaging a fixed contact ring 115 connected to the contact 105 and the contact 108. Thus, the one sides of the magnets 85 and 88 may be connected to one side of the D. C. supply through the contact 108 of the switch 109 or through the second contact 111 of the switch 109 and the single-throw switch C.

The single-throw switch C being mechanically coupled to the selector switches A and B is arranged to be closed only when the thermo-couple 1 of the first furnace is in the bridge circuit and the movable contact 110 of the double-throw switch 109 is adapted to engage the second fixed contact 111 thereof only when No. 1 pen 59 is in the operative position by means of a single rise cam 116 which is mounted on the shaft 66 of the pen carrier and is located in the cut-away portion of the arm 57 accommodating the ratchet wheel, the movable contact 110 of the double-throw switch 109 being in engagement with the first fixed contact 108 thereof when the other pens 59 are in the operative position. It will be apparent, therefore, that it is possible to obtain a false indication from pens Nos. 2–6, inclusive, but that when No. 1 pen is brought into the operative position, the trip and colour change magnets 85 and 88 can not be energised and, therefore, no recording will be made on the recording surface and the carrier for the pens will not be rotated, until the selector switches A and B again complete the bridge circuit through the thermo-couple 1 of No. 1 furnace and the single-throw switch C coupled to the selector switches is closed.

In operation of the synchronising gear (see Figs. 8 and 9), with No. 1 pen 59 in the operative position, the selector switches connect the thermo-couple 1 of No. 1 furnace to the bridge circuit and the rebalancing motor 30 is rotated in the appropriate direction to traverse the carriage 26 across the recording surface and to adjust the slider 24 along the slide wire 25 until the bridge circuit is balanced, whereupon the motor is de-energised. The trip magnet 85 is connected to the D. C. supply through the switch 100, the second fixed contact 111 of the double-throw switch 109 and the switch C, and releases the pair of L-shaped arms 79 and 80 to lower No. 1 pen 59 and its nib 60 into contact with the recording surface 53. Upon raising the pen carrier 57 and No. 1 pen 59 by actuation of the switch 103 to energise the colour change magnets 88, the pawl 73 causes the ratchet wheel 72 to rotate through one tooth, thereby rotating the carrier 57 for the pens and bring No. 2 pen 59 into the operative position. The selector switches A and B then connect the thermo-couple 2 of the second furnace into the bridge circuit, the carriage 26 is traversed across the recording surface 53, the trip magnet 85 is energised through the first fixed contact 108 of the switch 109 and the switch 100 to bring No. 2 pen and its nib into contact with the recording surface and the switch 103 actuated to energise the colour change magnets 88 for raising No. 2 pen and rotating the carrier 57 for the pens so that No. 3 pen is brought into the operative position. The same sequence of operations takes place for pens Nos. 3–6, inclusive, as those described with reference to No. 2 pen.

Although the invention has been described by way of example as applied to an instrument for successively recording the instantaneous temperatures of a bank of six furnaces, it will be apparent that it is applicable to the recording of the instantaneous values of variable conditions from any different sources on a single recording surface.

What we claim is:

1. A recording instrument comprising a recording surface, a carriage, means for advancing said surface relative to said carriage in a given direction, means for constraining said carriage to move in a direction transverse to said given direction, a plurality of signal-generating devices, means capable of responding to a signal from said signal-generating devices to cause said carriage to be displaced through a distance proportional to the value of said signal, means for selectively connecting each of the signal-generating devices in turn to said signal-responsive means in accordance with a cycle which is continuously repeated, a plurality of recording elements displaceably mounted on the carriage, each of said elements being arranged to produce a record having a characteristic identifiable with one only of said signal-generating devices, means for advancing each of said elements in turn into an operative position, and means for bringing the recording element which is in the operative position into recording engagement with the recording surface after each displacement of the carriage, including synchronising means for ensuring that the cycle of displacement of the recording elements shall be brought into step with the cycle of connection of the signal-generating devices to the signal-responsive means, said synchronising means comprising a pair of devices which must be simultaneously in an operative condition once in each cycle in order that the means for bringing the recording element into recording engagement with the recording surface may function for a single selected recording element, one of said means being rendered operative only when said selected recording element is in the operative position and the other of said devices being rendered operative only when a particular signal-generating means is connected to the signal responsive means.

2. A recording instrument according to claim 1 wherein each recording element is a pen comprising a closed tube of rectangular cross-section made of sheet metal the longitudinal edges of which provide an upstanding rib which is cut away to leave a triangular-shaped projection constituting the nib adjacent one end of the tube, and aperture being provided at the other end of the tube.

3. A recording instrument comprising a recording surface, a carriage, means for advancing said surface relative to said carriage in a given direction, means for constraining said carriage to move in a direction transverse to said given direction, a plurality of signal-generating devices, means capable of responding to a signal from said signal-generating devices to cause said carriage to be displaced through a distance proportional to the value of said signal, first switch means for selectively connecting each of said signal-generating devices in turn to said signal-responsive means in accordance with a cycle which is continuously repeated, a plurality of recording elements displaceably mounted on the carriage, each of said elements being arranged to produce a record having a characteristic identifiable with one only of said signal-generating devices, means for advancing each of said elements in turn into an operative position, and electro-magnetic means operable upon completion of an electrical circuit to bring the recording element which is in the operative position into recording engagement with the recording surface after each displacement of the carriage, including means for ensuring that the cycle of displacement of the recording elements shall be brought into step with the cycle of connection of the signal-generating devices to the signal-responsive means comprising second and third switch means which must be simultaneously in an operative condition once in each cycle to close said electrical circuit in order that the means for displacing the recording element into engagement with the recording surface may function for a single selected recording element said second switch means being rendered operative only when said selected recording element is in the operative position and said third switch means being rendered operative only when a particular signal-generating means is connected to the signal responsive means.

4. A recording instrument comprising a recording surface a carriage, means for advancing said surface relative to said carriage in a given direction, means for constraining said carriage to move in a direction transverse to said given direction, a plurality of signal generating devices, means capable of responding to a signal from said signal-generating devices to cause said carriage to be displaced through a distance proportional to the value of said signal, a first rotatable switch means for selectively connecting each of said signal-generating devices in turn to said signal responsive means in accordance with a cycle which is continuously repeated, a recording unit rotatably mounted on said carriage, a plurality of recording elements mounted on said unit, each of said elements being capable of assuming in turn an operative position relative to said surface and being arranged to produce a record having a characteristic identifiable with one only of said signal generating devices, electromagnetic means operable upon completion of an electrical circuit to move said unit relative to said carriage to produce a record on said surface, means mounted on said carriage to rotate said unit relative thereto after each recording operation to bring the next succeeding recording element to the operative position, a second rotatable switch means connected in said circuit and arranged to be closed each time said first switch means connects one of said signal generating devices to said signal responsive means, a third rotatable switch means mounted on said unit and rotatable therewith to normally close said circuit to operate said electromagnetic means upon each closure of said second switch means and arranged to open said circuit upon a single selected recording element assuming the operative position and a fourth rotatable switch means associated with said first switch means and arranged to close said circuit upon a single selected signal generating device being connected to said signal responsive means to operate said electromagnetic means to produce a record from said selected recording element only when said selected signal generating device is connected to said signal responsive means.

5. A recording instrument according to claim 4 wherein said means for rotating the recording unit relative to the carriage after each recording operation comprises a ratchet wheel fixedly secured to said unit and provided with a number of teeth corresponding to the number of recording elements and a pawl pivotally attached to said carriage and arranged to engage a tooth of said ratchet wheel such that the pawl will engage the next succeeding tooth upon movement of the unit relative to the carriage to produce a record and will rotate said ratchet wheel and unit upon the latter returning to the inoperative position.

6. A recording instrument comprising a recording surface, a carriage, means for advancing said surface relative to said carriage in a given direction, means for constraining said carriage to move in a direction transverse to said given direction, a plurality of signal generating devices, means capable of responding to a signal from said signal-generating devices to cause said carriage to be displaced through a distance proportional to the value of said signal, a first rotatable switch means for selectively connecting each of said signal-generating devices in turn to said signal responsive means in accordance with a cycle which is continuously repeated, a recording unit rotatably mounted on said carriage, a plurality of recording elements mounted on said unit, each of said elements being capable of assuming in turn an operative position relative to said surface and being arranged to produce a record having a characteristic identifiable with one only of said signal generating devices, electromagnetic means operable upon completion of any one of two electrical circuits arranged in parallel to move said unit relative to said carriage to produce a record on said surface, the first of said circuits including a second switch and a third switch and the second of said circuits including a fourth switch and a fifth switch, means mounted on said carriage to rotate said unit relative thereto after each recording operation to bring the next succeeding recording element to the operative position, means mounted on said unit and rotatable therewith to close said second switch when all but a single selected recording element are in the operative position and to close said fourth switch only when said selected recording element assumes the operative position, means rotatable in step with said first rotatable switch means and arranged to close said third switch to complete said first circuit when all but said selected recording element assumes the operative position to operate the electromagnetic means accordingly and further means rotatable in step with said first rotatable means and arranged to close said fifth switch only upon a single selected generating device being connected to said signal responsive means to complete said second circuit to operate said electromagnetic means and synchronize said selected recording element with said selected signal generating device once in each cycle.

GEORGE OLAH.
HERBERT ARTHUR SMITH.

References Cited in the file of this patent

UNITED STATES PATENTS

| Number | Name | Date |
|---|---|---|
| 2,027,945 | Widmer | Jan. 14, 1936 |
| 2,082,591 | Newman | June 14, 1937 |
| 2,118,081 | Grisdale | May 24, 1938 |
| 2,125,345 | Hunt | Aug. 2, 1938 |
| 2,191,673 | Moore | Feb. 27, 1940 |
| 2,423,480 | Caldwell | July 8, 1947 |

FOREIGN PATENTS

| Number | Country | Date |
|---|---|---|
| 560,827 | Great Britain | Apr. 21, 1944 |